United States Patent
Lee

(10) Patent No.: US 11,563,619 B2
(45) Date of Patent: Jan. 24, 2023

(54) OPERATING METHOD FOR ELECTRONIC DEVICE AND SIGNAL PROCESSOR INCLUDED IN THE ELECTRONIC DEVICE

(71) Applicant: Samsung Electronics Co., Ltd., Suwon-si (KR)

(72) Inventor: Hae Chul Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 251 days.

(21) Appl. No.: 16/749,091

(22) Filed: Jan. 22, 2020

(65) Prior Publication Data
US 2021/0014100 A1 Jan. 14, 2021

(30) Foreign Application Priority Data
Jul. 11, 2019 (KR) .................. 10-2019-0083677

(51) Int. Cl.
*H04L 27/26* (2006.01)
*H04J 11/00* (2006.01)
*H04B 17/327* (2015.01)

(52) U.S. Cl.
CPC ....... *H04L 27/2688* (2013.01); *H04B 17/327* (2015.01); *H04J 11/0076* (2013.01); *H04L 27/2656* (2013.01); *H04L 27/2671* (2013.01); *H04L 27/2675* (2013.01)

(58) Field of Classification Search
CPC .... H04L 27/2656–2688; H04B 1/7083; H04B 17/30–391; H04J 11/0069–0093
See application file for complete search history.

(56) References Cited

U.S. PATENT DOCUMENTS

| | | | |
|---|---|---|---|
| 9,794,015 B2 | 10/2017 | Tabet et al. | |
| 2002/0027898 A1* | 3/2002 | Tanno | H04B 1/70735 375/152 |
| 2011/0026649 A1* | 2/2011 | Lipka | H04L 27/2675 375/343 |
| 2016/0165613 A1* | 6/2016 | Gowda | H04J 11/0076 370/335 |
| 2017/0093508 A1 | 3/2017 | Martin | |
| 2017/0093540 A1 | 3/2017 | Lei et al. | |
| 2017/0135052 A1 | 5/2017 | Lei et al. | |
| 2017/0264406 A1* | 9/2017 | Lei | H04L 27/26132 |
| 2020/0196256 A1* | 6/2020 | Shin | H04J 11/0073 |
| 2020/0374099 A1* | 11/2020 | Li | H04B 7/06 |

FOREIGN PATENT DOCUMENTS

| | | |
|---|---|---|
| JP | 2018191130 A | 11/2018 |
| KR | 20180080967 A | 7/2018 |
| KR | 20180116273 A | 10/2018 |
| WO | WO-2017213750 A1 | 12/2017 |

* cited by examiner

*Primary Examiner* — Michael Thier
*Assistant Examiner* — Prince A Mensah
(74) *Attorney, Agent, or Firm* — Harness, Dickey & Pierce, P.L.C.

(57) ABSTRACT

An operating method for an electronic device and a signal processor included in the electronic device are provided. The operating method for an electronic device comprises a descrambling a synchronization signal received from a cell, acquiring a time domain average signal on the descrambled synchronization signal, executing a differential correlation on the time domain average signal by a predetermined reference, and measuring a power of the synchronization signal provided from the cell, using the differential.

20 Claims, 16 Drawing Sheets

OPERATING METHOD FOR ELECTRONIC DEVICE AND SIGNAL PROCESSOR INCLUDED IN THE ELECTRONIC DEVICE

This application claims priority from Korean Patent Application No. 10-2019-0083677 filed on Jul. 11, 2019 in the Korean Intellectual Property Office, the disclosure of which is incorporated herein by reference in its entirety.

BACKGROUND

1. Field

The present invention relates to an operating method for an electronic device and a signal processor included in the electronic device.

2. Description of the Related Art

The Internet of Things (IoT), which is in the limelight as a new service for next-generation mobile communications, is attracting a great deal of attention mainly by telecommunications carriers and terminal manufacturers. As a result, standardization organizations, such as 3rd generation partnership project (3GPP), have standardized communication technologies for IoT. For example, release-13 of 3GPP standardized Cat-M1 and the narrowband Internet of Things (NB-IoT).

In the NB-IoT communication system, power (NRSRP; Narrow Reference Signal Received Power) of a synchronization signal received from a cell may be measured, for example, using NRS (Narrow Reference Signal) included in the synchronization signal. Incidentally, since NRS may have a very small subframe that may be used for NRSRP measurement in some cases, NRSRP measurement performance using NRS may not be good in an environment in which a SINR (Signal to Interference plus Noise Ratio) is low. Thus, there is a need for a research for improving this.

SUMMARY

Aspects of the present invention provide an operating method for a communication device capable of minimizing the influences of noise and improving cross-correlation characteristics in measuring the power of a signal provided from a cell.

Aspects of the present invention also provide a signal processor capable of minimizing the influences of noise and improving cross-correlation characteristics in measuring the power of the signal provided from the cell.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present inventive concepts, there is provided an operating method for an electronic device comprises descrambling a synchronization signal received from a cell, acquiring a time domain average signal based on the descrambled synchronization signal, executing a differential correlation on the time domain average signal based on a criterion, and measuring a power of the synchronization signal from the cell using a result of the executed differential correlation.

According to an aspect of the present inventive concepts, there is provided a signal processor comprises a descrambler configured to receive a synchronization signal from a cell and descramble the synchronization signal, a time domain average calculator configured to receive the descrambled synchronization signal and execute a time domain average calculation to output a time domain average signal, a differential correlation calculator configured to receive the time domain average signal and execute a differential correlation to output a result of the executed differential correlation, and a power estimator which measures a power of a synchronization signal provided from the cell, using a result of the differential correlation calculator.

According to an aspect of the present inventive concepts, there is provided an operating method for an electronic device, comprises descrambling NSSS in a synchronization signal including NSSS received from a cell, calculating an average between eight symbol periods of the descrambled NSSS and acquiring a time domain average signal on the basis of the average, executing a differential correlation on the time domain average signal at a first and a second frequency axis interval to acquire a first and a second result, the first and second frequency axis interval being differing from each other, and measuring each NRSRP on the first and second results, and determining a measurement value, the measurement value having the smaller value among the first and second results as an NRSRP of the synchronization signal provided from the cell.

BRIEF DESCRIPTION OF THE DRAWINGS

The above and other aspects and features of the present invention will become more apparent by describing in detail example embodiments thereof with reference to the attached drawings, in which.

DETAILED DESCRIPTION OF THE EMBODIMENTS

Embodiments according to the technical idea of the present invention will be described below with reference to the accompanying drawings.

Figure 1:
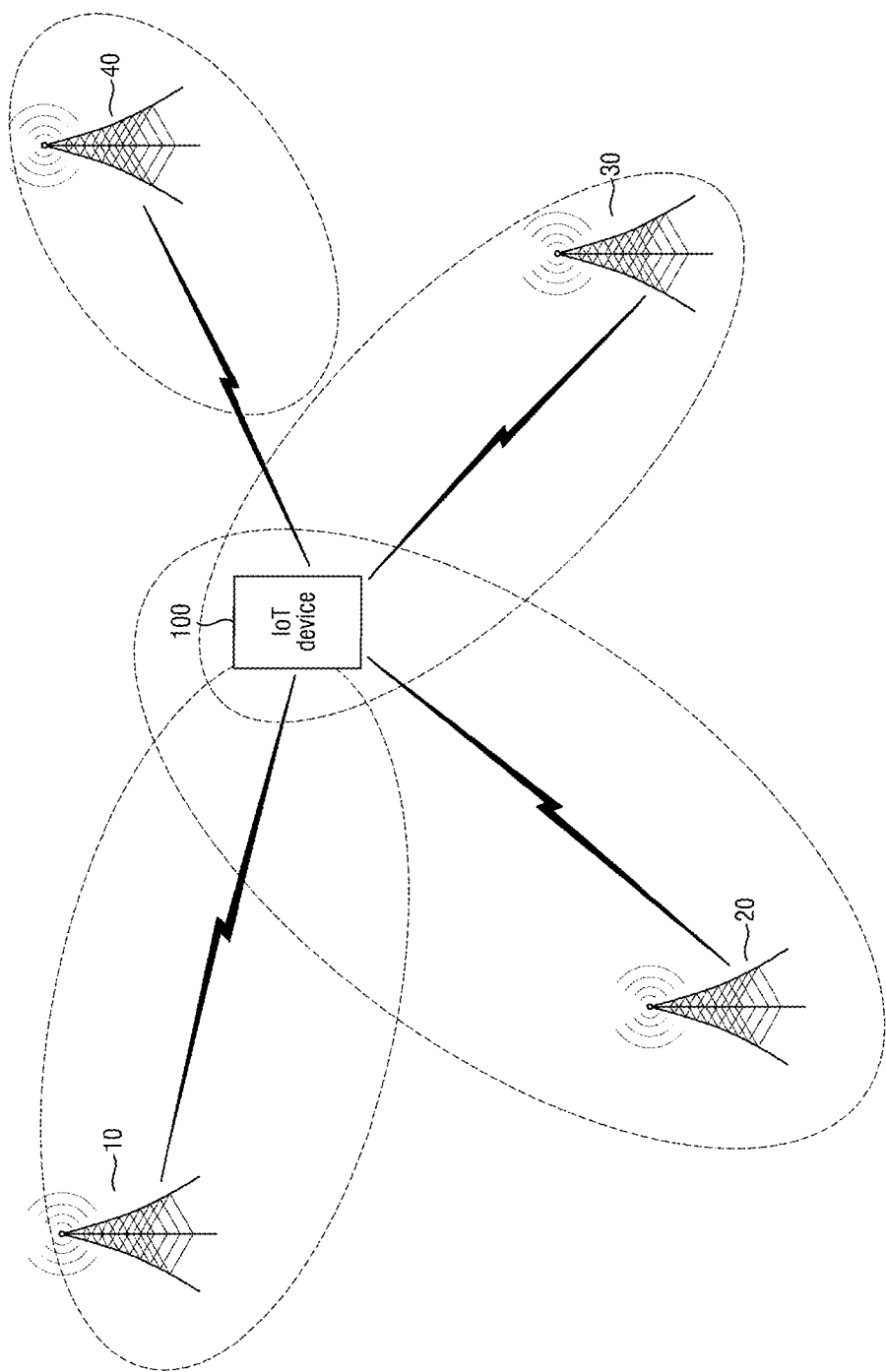
FIG. 1 is a diagram showing a wireless communication system according to some embodiments.
Figure 2:
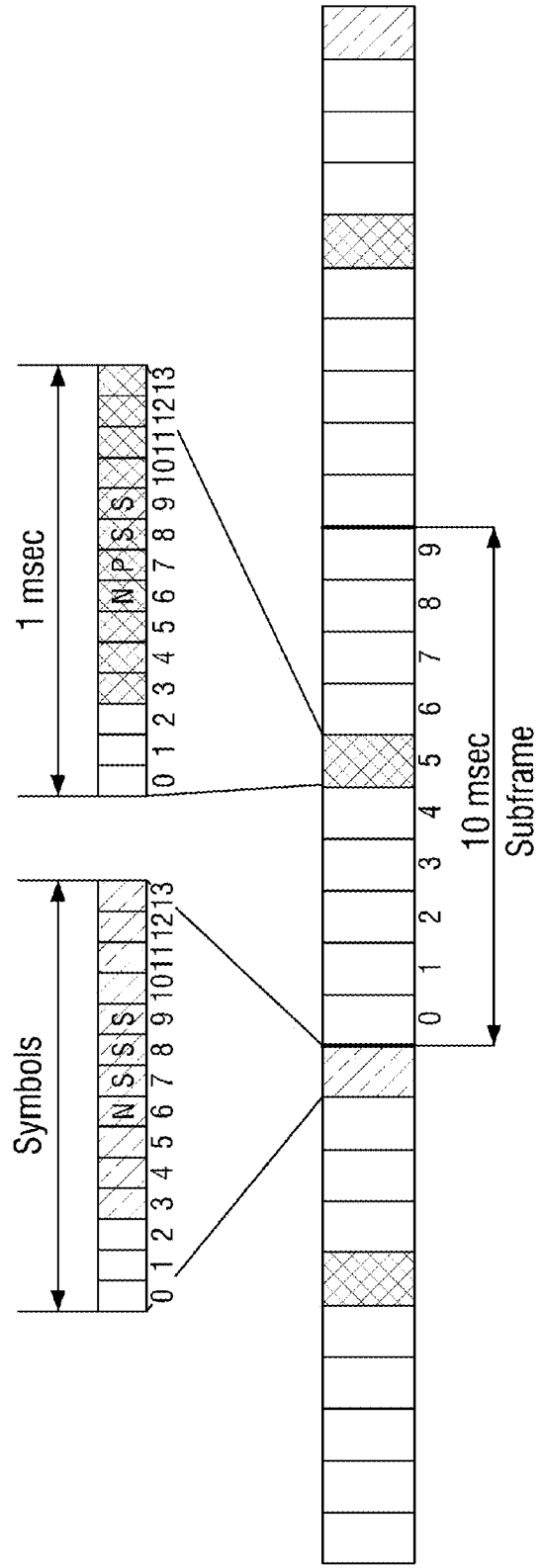
FIG. 2 is a diagram for explaining a synchronization signal provided from each cell of FIG. 1 to an IoT device.

FIG. 1 is a diagram showing a wireless communication system according to some embodiments. FIG. 2 is a diagram for explaining a synchronization signal provided from each cell of FIG. 1 to the IoT device.

Referring to FIG. 1, the wireless communication system may include a plurality of cells 10, 20, 30, and 40 and an Internet of Things (IoT) device 100. The IoT device 100 may include any electronic device that supports IoT technique. Although FIG. 1 shows that the wireless communication system includes four cells 10, 20, 30, and 40, the embodiments are not limited thereto. If desired, the number of cells may be modified to be more or less than those shown.

The IoT device 100 may be connected to the wireless communication system by transmitting and receiving signals to and from the cells 10, 20, 30, and 40. The wireless communication system to which the IoT device 100 is connectable may include, for example, a Narrow Band-IoT (NB-IoT) communication system.

However, the embodiments are not limited thereto, and the wireless communication systems to which the IoT device 100 is connectable may be, for example, a wireless communication system using a cellular network, such as a 5th generation wireless (5G) communication system, a long term evolution (LTE) communication system, an LTE-Advanced communication system, a code division multiple access (CDMA) communication system, and a global system for mobile communications (GSM) communication system. Also, in some embodiments, the wireless communication system may be a wireless local area network (WLAN) communication system or any other wireless communication system.

Hereinafter, although the description will be provided on the assumption that the wireless communication system to which the IoT device 100 is connected is an NB-IoT communication system, the technical idea of the present invention is not limited thereto.

The wireless communication network of the wireless communication system may support communication of a plurality of wireless communication devices including the IoT device 100, by sharing available network resources. For example, information may be transmitted in various multiple access methods, such as a code division multiple access (CDMA), a frequency division multiple access (FDMA), a time division multiple access (TDMA), an orthogonal frequency division multiple access (OFDMA), a single carrier frequency division multiple access (SC-FDMA), an OFDM-FDMA, an OFDM-TDMA, and an OFDM-CDMA in the wireless communication networks.

Each of the cells 10, 20, 30, and 40 may generally refer to a fixed station that communicates with the IoT device 100 and other cells, and may exchange data and control information by communicating with the IoT device 100 or other cells. Each of the cells 10, 20, 30, and 40 may also refer to temporary or mobile stations, like mobile hotspots, that communicate with the IoT device 100 and other cells.

For example, each of the cells 10, 20, 30, and 40 may be referred to as a base station, a Node B, an evolved-Node B (eNB), a next generation Node B (gNB), a sector, a site, a base transceiver system (BTS), an access pint (AP), a relay node, a remote radio head (RRH), a radio unit (RU), a small cell and the like. In the specification, the cell or the base station may be interpreted as representing some of the areas or functions covered by, for example, a base station controller (BSC) in the CDMA, a Node-B of the WCDMA, an eNB or sector (site) in the LTE, etc. Further, the cell or the base station may include all the various coverage areas such as a mega cell, a macro cell, a micro cell, a pico cell, a femto cell, a relay node, a RRH, a RU, a small cell communication range.

The IoT device 100 may be, for example, user equipment (UE). The IoT device 100 may refer to any fixed or mobile device. The IoT device 100 may communicate with the cells 10, 20, 30, and 40 to transmit and receive data or control information. For example, the IoT device 100 may include a home appliance that includes an IoT module, and in some embodiments, the IoT device 100 may be referred to as a mobile station (MS), a mobile terminal (MT), a user terminal (UT), a subscribe station (SS), a wireless device, a handheld device and the like. The IoT module may include processing circuitry such hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

Referring to FIG. 1, each of the cells 10, 20, 30, and 40 may be connected to the IoT device 100 via a wireless channel to provide various communication services. Each of the cells 10, 20, 30, and 40 may allow all the user traffic to be serviced via a shared channel, and may schedule the communication schedule by collecting status information such as a buffer status, an available transmission power status, and a channel status of the IoT device 100.

The description will be provided below mainly on the basis of on an example in which the IoT device 100 measures the power of the synchronization signal provided from the cells 10, 20, 30, and 40, and an example in which the cells 10, 20, 30, and 40 transmit synchronization signals including a narrow reference signal (NRS) or a narrow secondary synchronization signal (NSSS) necessary for power measurement to the IoT device 100 will be described.

Referring to FIGS. 1 and 2, in the NB-IoT communication system, a narrow primary synchronization signal (NPSS) and NSSS may be provided as synchronization signals for exploration of the cells 10, 20, 30, and 40.

FIG. 2 is a diagram showing structures of the NPSS and NSSS among the synchronization signals provided from the cells 10, 20, 30, and 40. For example, the NPSS may be transmitted to a third symbol to a thirteenth symbol of a fifth subframe for each frame having a 10 ms period, and a frame boundary information having the 10 ms period may be found by detecting the NPSS, as illustrated.

The NSSS may be transmitted to a third symbol to a thirteenth symbol of a ninth subframe for each even frame having a 20 ms period. Although the drawings show an embodiment in which NSSS is transmitted to the ninth subframe, the embodiments are not limited thereto. In some embodiments, for example, the NSSS may be transmitted to the third symbol to the thirteenth symbol of a 0th subframe for each even frame having a 20 ms period.

Since the NSSS transmits frame boundary information having 504 cell ID information and a 80 ms period, frame boundary information having a cell ID and an 80 ms period may be found by detecting the NSSS.

The NSSS may be configured, for example, using a Hadamard matrix and/or a phase rotation on the basis of a Zadoff-Chu sequence. The Zadoff-Chu sequence may generated 126 sequences, and the Hadamard matrix may generate 4 sequences so that a total of 504 cell ID information is divided, and the boundary information, each having a 20 ms period, may be displayed by 4 phase rotation values such that boundary information having a period of 80 ms may be obtained.

Figure 6:
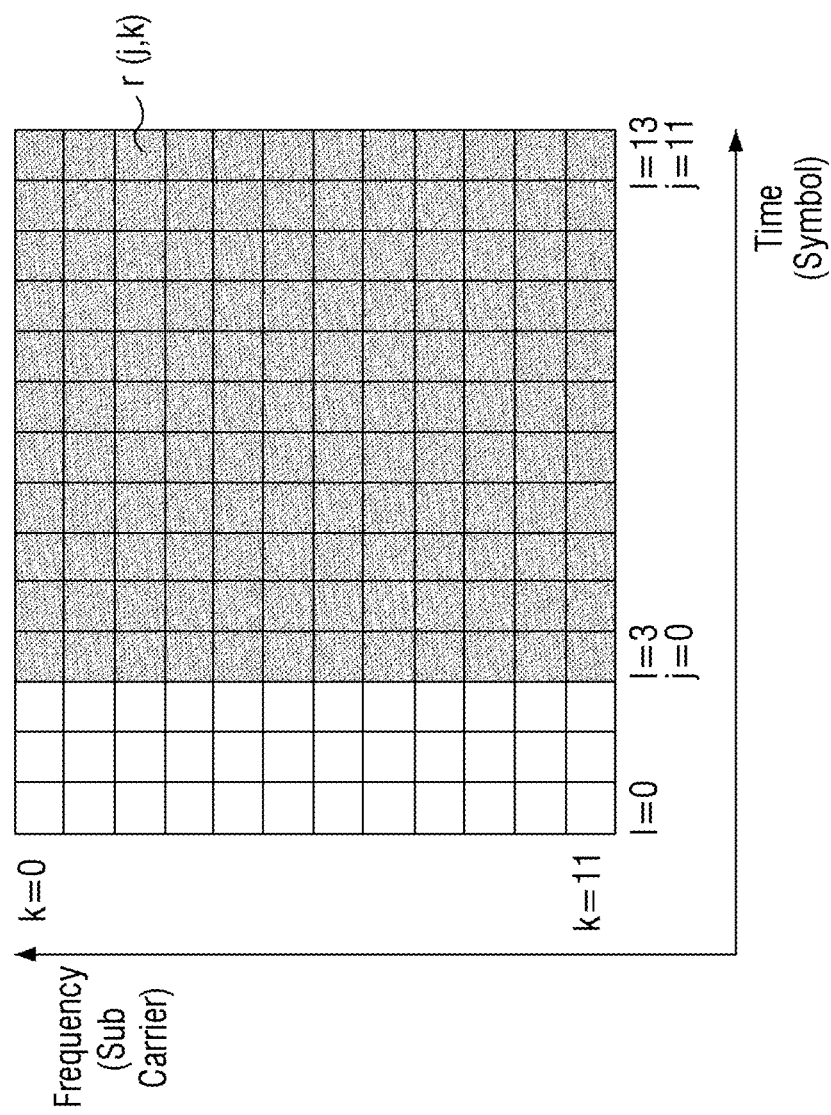
FIGS. 6 to 8 are diagrams for explaining the operating method for the IoT device of FIG. 5.
Figure 16:
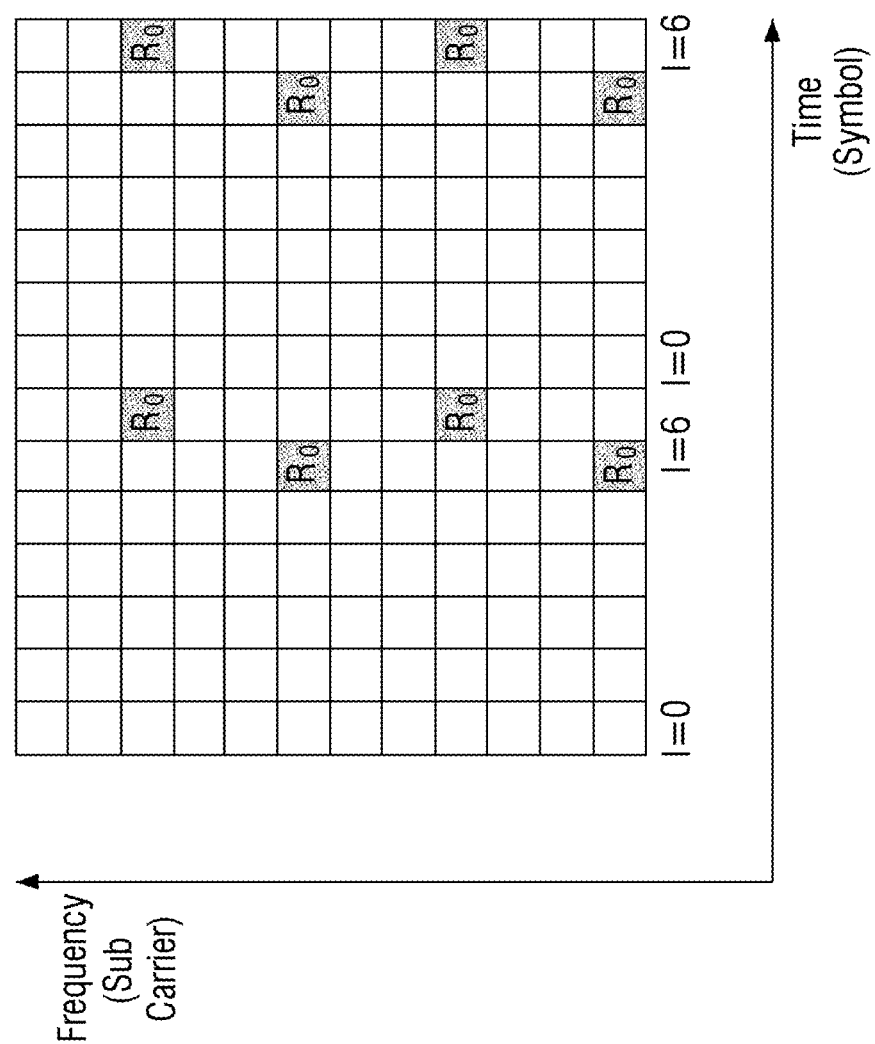
FIG. 16 is a diagram for explaining an NRS signal.

Because the NSSS contains a lot of data as compared to the aforementioned NRS, it may be advantageous for NRSRP measurement. Specifically, although the NRS transmits only a small amount of data in one subframe, for example, as shown in FIG. 16, the NSSS transmits a relatively large amount of data in one subframe, for example, as shown in FIG. 6. Further, it is necessary to measure NRSRP while maintaining the cross-correlation characteristics between the cell IDs at the time of NRSRP measurement of each cell by NSSS, so that the received power of each cell may be divided. If the measured NRSRP has higher cross-correlation characteristics than the NRSRP of a reference or a signal from a currently operating cell (for example one of cells 10 20 30 and/or 40 in communication with the IoT device 100) the IoT device 100 may select the signal with the higher cross-correlation characteristics.

Hereinafter, a NRSRP measurement method capable of minimizing the influences of noise and improving the cross-correlation characteristics in measuring the power of signals provided from the cells 10, 20, 30, and 40 will be described.

Figure 3:
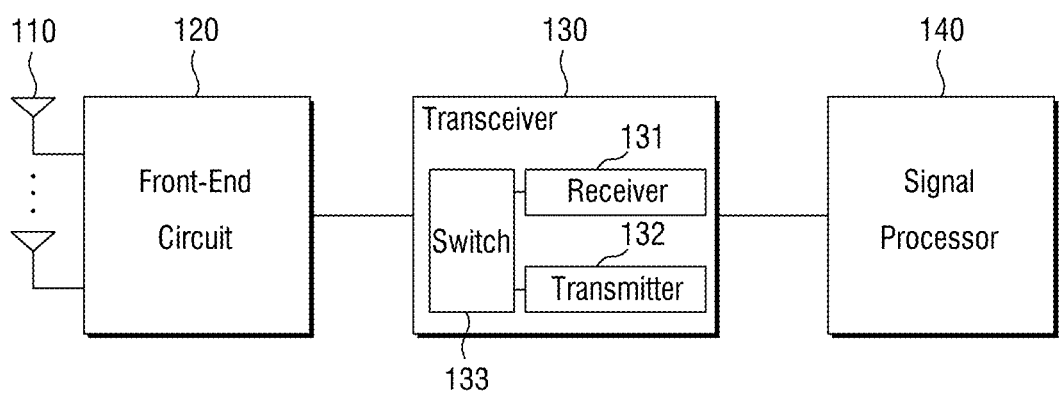
FIG. 3 is a block diagram for explaining some configurations included in the IoT device of FIG. 1.

FIG. 3 is a block diagram for explaining some configurations included in the IoT device of FIG. 1.

Referring to FIG. 3, the IoT device 100 may include an antenna, or a plurality of antennas 110, a front-end circuit 120, a transceiver 130, and a signal processor 140.

The antenna or the plurality of antennas 110 may be connected to the front-end circuit 120, and may transmit the signal to be provided from the front-end circuit 120 to other communication equipment (communication devices or cells) or may provide signals to be received from other communication equipment to the front-end circuit 120.

In some embodiments, the IoT device 100 may support a phased array, a multiple-input and multiple-output (MIMO), or the like, using the plurality of antennas 110.

The front-end circuit 120 may include an antenna tuner (not shown), and the antenna tuner (not shown) may be connected to the antennas 110 to adjust the impedance of the antennas 110.

The transceiver 130 may include a receiver 131, a transmitter 132, and a switch 133. The receiver 131 may generate a baseband received signal by processing the RF received signal received from the switch 133. For example, the receiver 131 may include a filter, a mixer, a low noise amplifier, and the like. The receiver 131 may process the RF band synchronization signal from the switch 133 to generate baseband synchronization signals, and the baseband synchronization signals may be provided to the signal processor 140.

The transmitter 132 may generate an RF transmission signal by processing the baseband transmission signal to be received from the signal processor 140. For example, the transmitter 132 may include a filter, a mixer, a power amplifier, and the like.

The signal processor 140 may measure NRSRP, using the provided synchronization signals. Hereinafter, the signal processor 140 according to some embodiments will be described more specifically with reference to FIG. 5.

Figure 4:
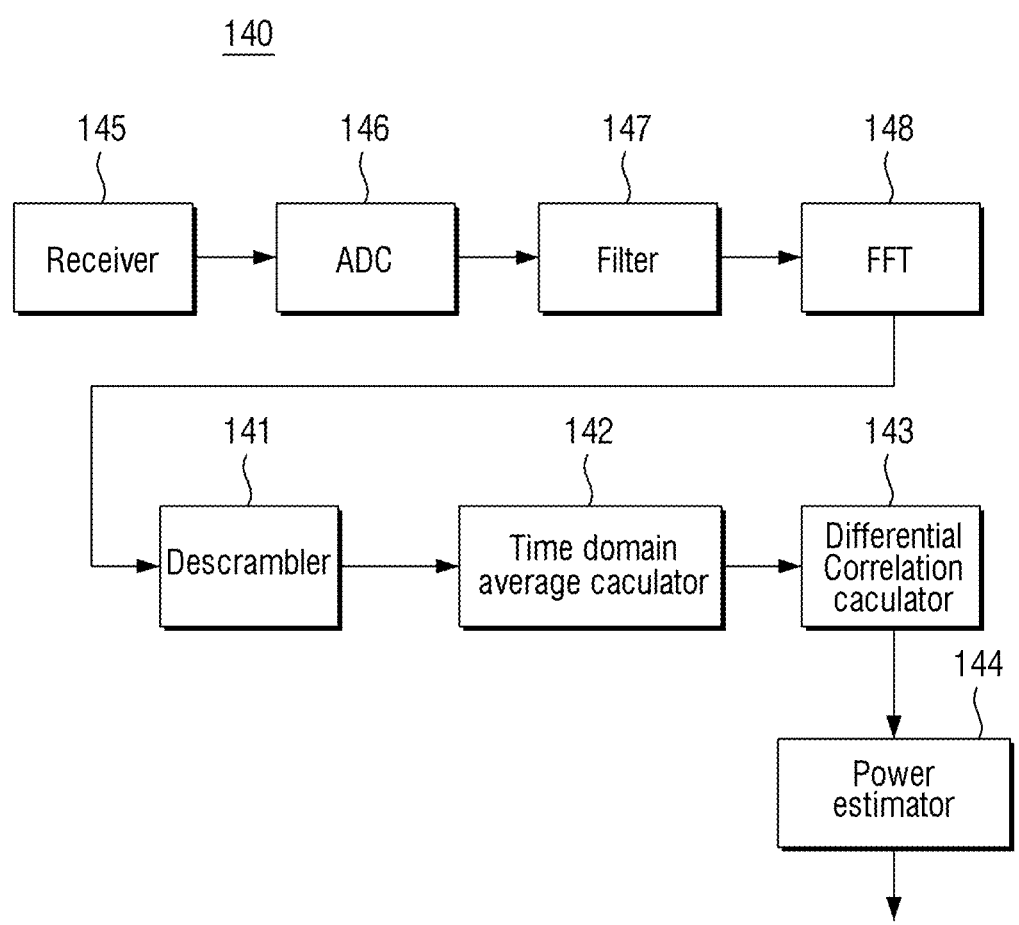
FIG. 4 is a block diagram for explaining the signal processor of FIG. 3.

FIG. 4 is a detailed block diagram for explaining the signal processor of FIG. 3.

Referring to FIG. 4, the signal processor 140 may include a receiver 145, an analog-to-digital converter 146, a filter 147, an FFT 148, a descrambler 141, a time domain average calculator 142, a differential correlation calculator 143 and a power estimator 144.

The constituent elements included in the illustrated signal processor 140 may be implemented as a dedicated hardware block designed through logic synthesis or the like, implemented as part of a processor architecture including at least one processor and a software block executed by the at least one processor, and may be implemented as a combination of a dedicated hardware block and a processor. The processor 140 may include processing circuitry such hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

The receiver 145 of the processor may receive the synchronization signal from the transceiver 132 of FIG. 3, and may process the baseband synchronization signal and/or forward the synchronization signal to other elements, like the descrambler 141, of the signal processor 140.

The descrambler 141 receives the synchronization signal received from the cell and may descramble the synchronization signal in accordance with a predetermined rule. Specifically, the descrambler 141 may descramble the NSSS received from the cell in accordance with a predetermined rule.

The time domain average calculator 142 may receive a descrambled signal from the descrambler 141, perform a time domain average calculation, and output a time domain average signal.

The differential correlation calculator 143 may receive a time domain average signal, perform a differential correlation on the time domain average signal, and output the result thereof.

The power estimator 144 may measure the power of the synchronization signal provided from the cell, using the result of the differential correlation calculator 143. Specifically, although the power estimator 144 may measure the NRSRP of the synchronization signal provided from the cell, the embodiments are not limited thereto.

The specific operations of the descrambler 141, the time domain average calculator 142, the differential correlation calculator 143, and the power estimator 144 will be described more specifically, while describing the operating method for the electronic device according to some embodiments with reference to FIGS. 5 through 8.

Figure 5:
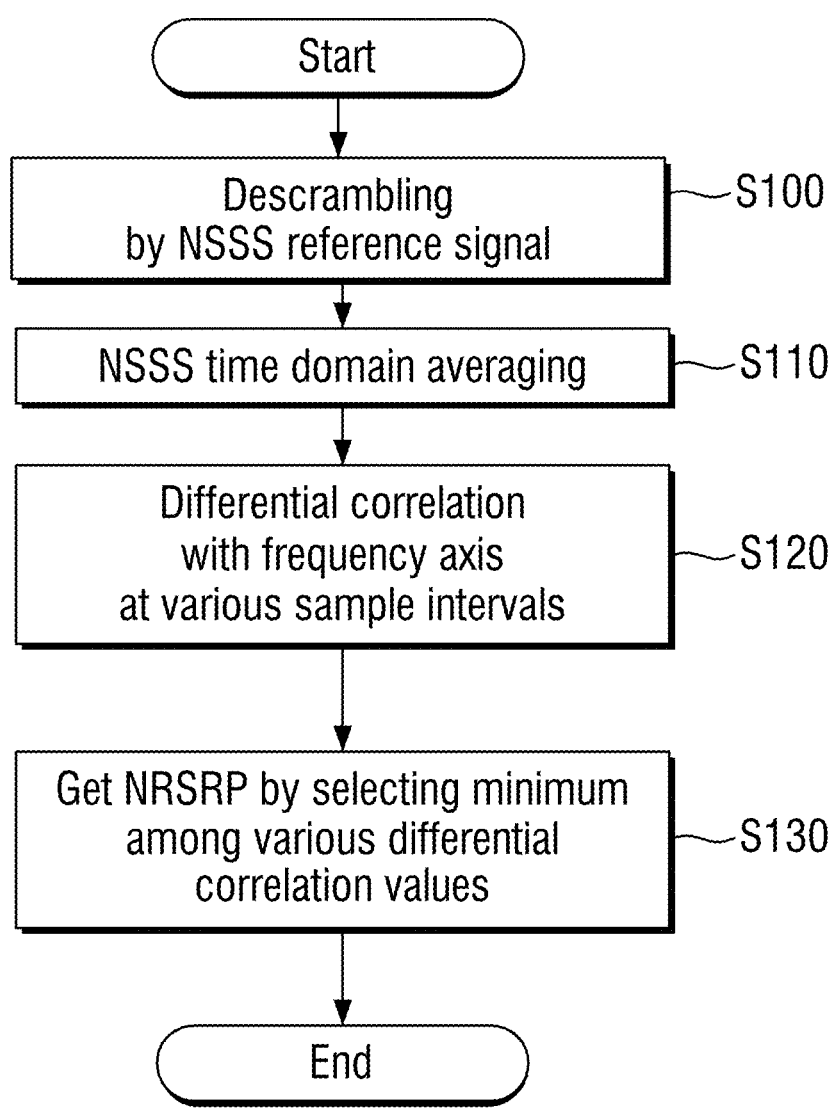
FIG. 5 is a flowchart for explaining an operating method for the IoT device according to some embodiments.
Figure 7:
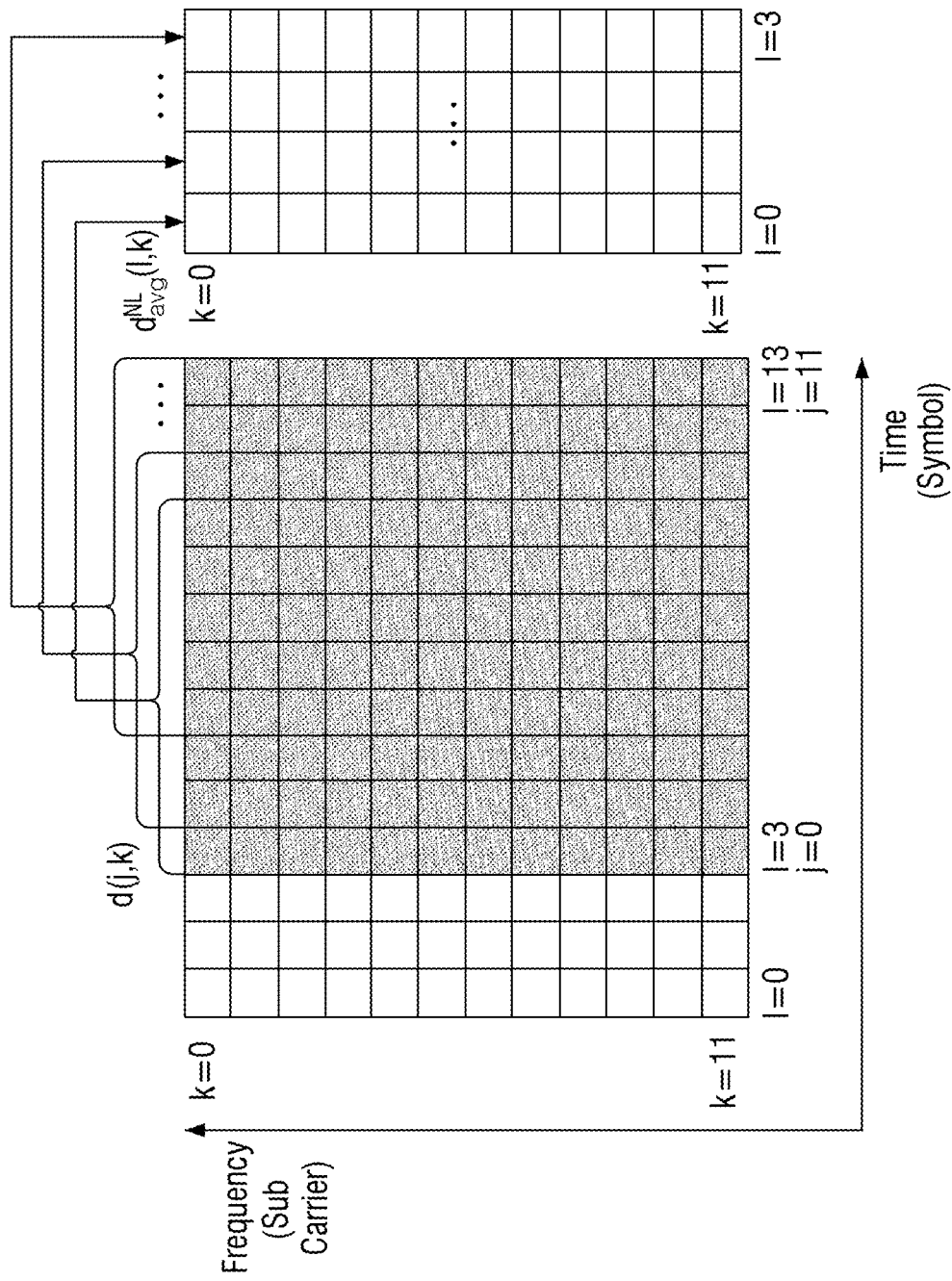
Figure 8:
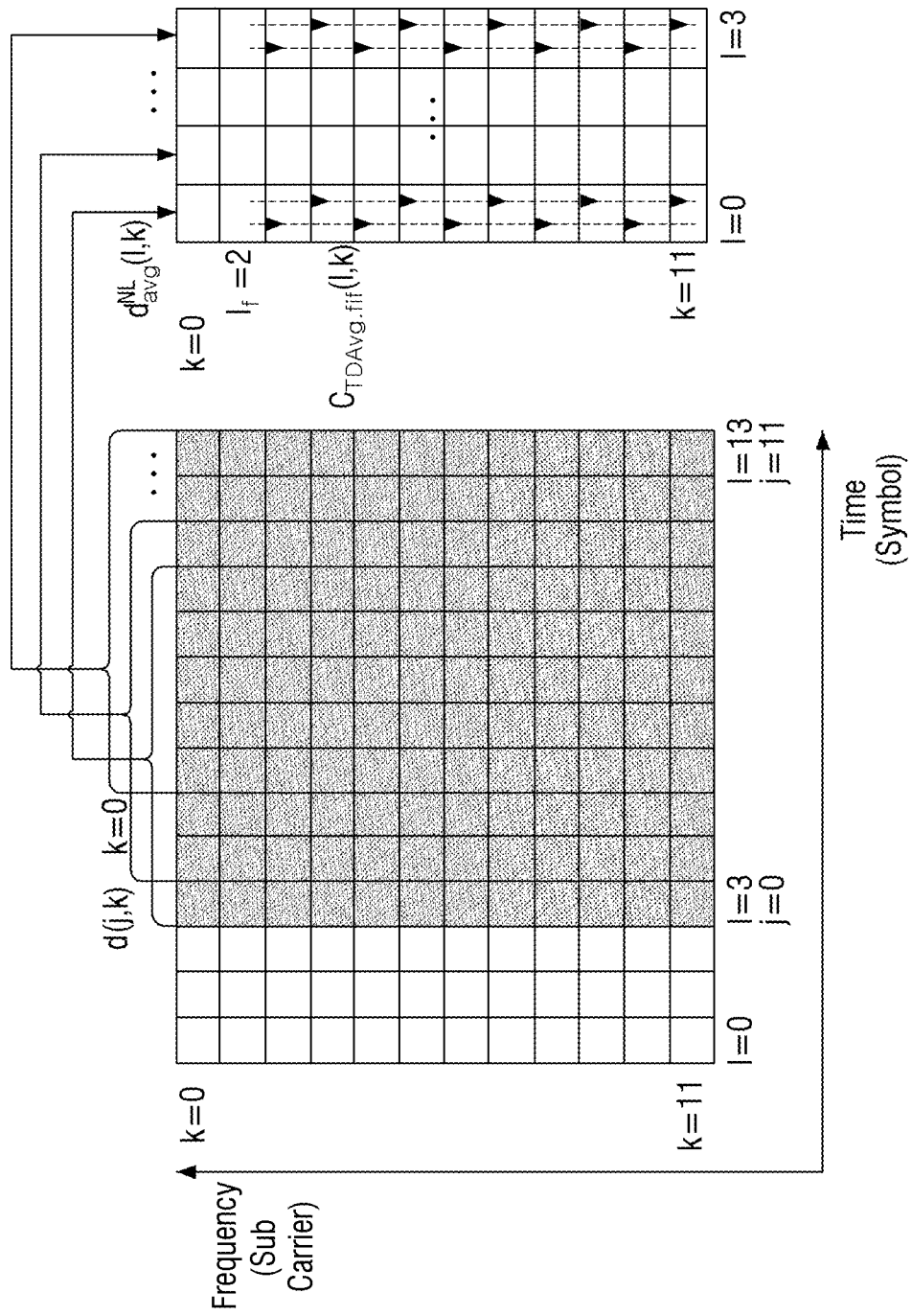
Figure 9:
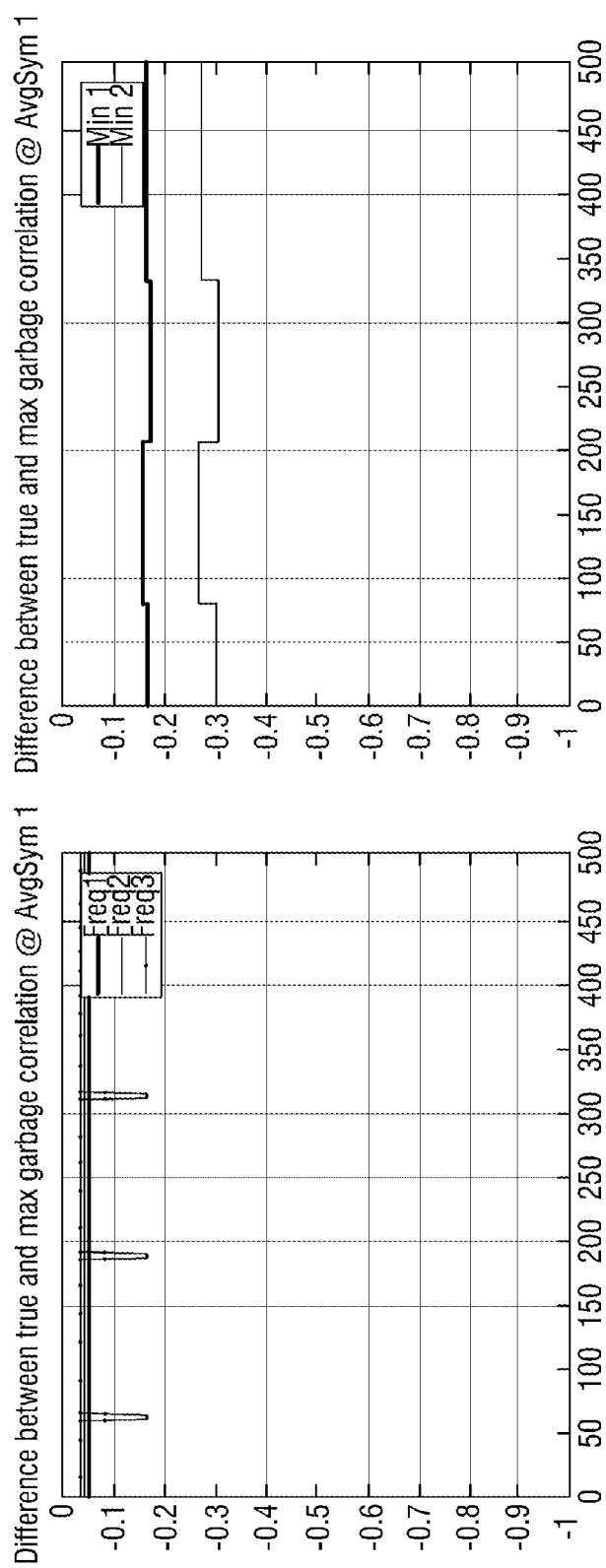
FIGS. 9 to 12 are diagrams for explaining the effects of the operating method for the IoT device according to some embodiments.
Figure 10:
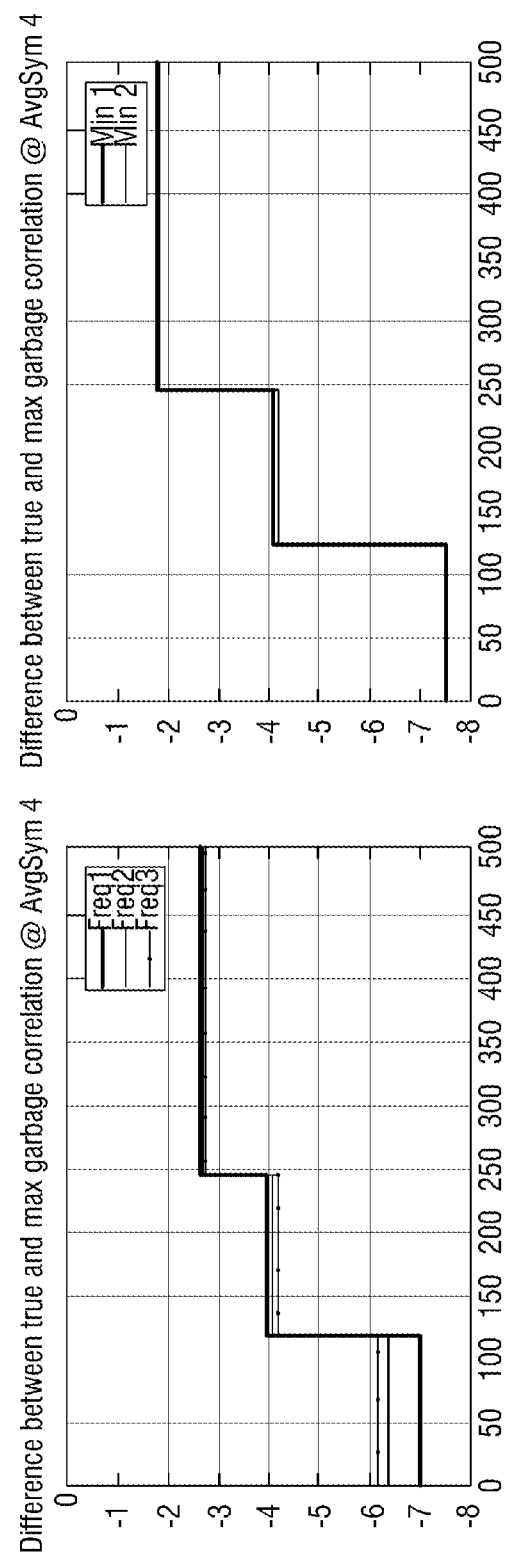
Figure 11:
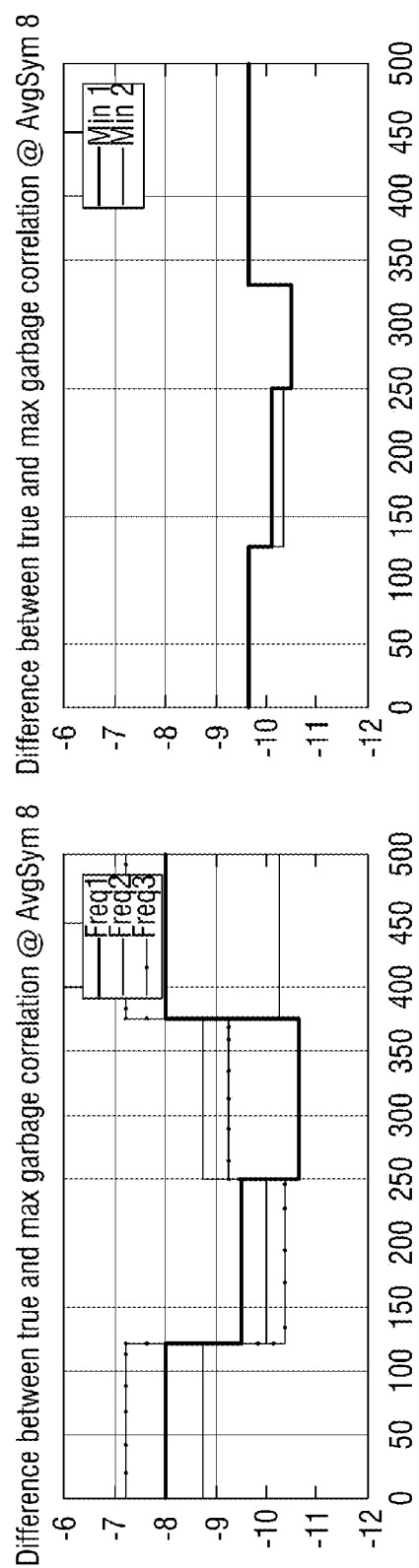
Figure 12:
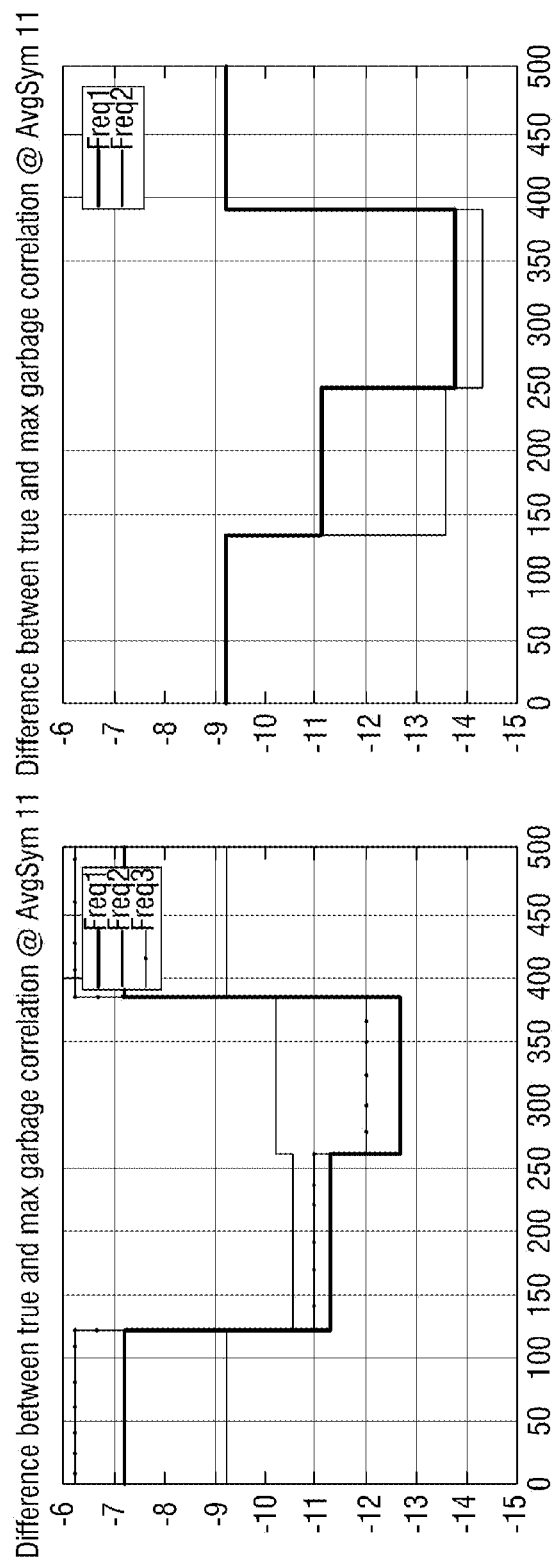

FIG. 5 is a flowchart for explaining an operating method for the IoT device according to some embodiments. FIGS. 6 to 8 are diagrams for explaining an operating method for the IoT device of FIG. 5.

Referring to FIG. 5, a synchronization signal received from a cell is descrambled (S100).

For example, an NSSS received from the cell may be descrambled.

The NSSS may be transmitted to third to thirteenth symbols in the ninth subframe of an even frame, as shown in FIG. 2. Specifically, referring to FIG. 6, in the NSSS, data may be provided at positions corresponding to 12 symbols (third symbols ($l=3$) to thirteenth symbol ($l=13$)) among 14 symbols from the 0th symbol ($l=0$) to the thirteenth symbol ($l=13$) included in the ninth subframe of the even frame. As shown in the drawing, the data may exist by being divided into positions corresponding to the 0th subcarrier ($k=0$) to the eleventh subcarrier ($k=11$) for each symbol. On the other hand, NSSS data may not exist at positions corresponding to the 0th symbol ($l=0$) to the second symbol ($l=2$) included in the subframe.

Assuming that $r(j,k)$ is a signal received at a position corresponding to a j-th (here, since there is no need to consider a symbol in which no data exists, $j=1\text{--}3$) symbol and a k-th subcarrier of the NSSS shown in FIG. 6, a signal d(j,k) that is descrambled in NSSS sequence from r(j,k) may be obtained, using the following Formula 1.

$$d(j, k) = r(j, k) \cdot conj\left(S_{CID,\theta_f}(j, k)\right) \quad <\text{Formula 1}>$$

(Here, $S_{CID,\theta_f}(j,k)$ means data of the j-th symbol and k-th subcarrier of NSSS in which a cell ID is CID, and a cyclic shift indicating a frame boundary having a 20 ms period is $\theta_f$).

Referring to FIG. 5 again, the time domain average calculation is performed (S110).

For example, the time domain average calculation may be performed on the signal descrambled at step S100 to obtain a time domain average signal.

Specifically, referring to FIG. 7, first, it is determined for how many symbol intervals an average is obtained on the d(j,k) signal. Further, an average is calculated based on the d(j,k) signal for the determined number of symbol intervals.

$d_{avg}^{N_L}(l,k)$ of the following Formula 2 is a signal obtained by averaging d(j,k) signals in the time domain for $N_L$ symbol intervals.

$$d_{avg}^{N_L}(l, k) = \frac{1}{N_L} \sum_{j=l}^{l+N_L-1} d(j, k) \quad <\text{Formula 2}>$$

When NRSRP is measured using the time domain average signal (e.g., $d_{avg}^{N_L}(l,k)$) obtained in this way, there are an effect of reducing the influences of noise and an effect capable of improving cross-correlation characteristics.

In some embodiments, $N_L$ may be a natural number. For example, $N_L$ may be eight (8). This value may be a value found to be an optimal value through multiple simulations. FIG. 7 shows an embodiment in which an average calculation is performed on the d(j,k) signal for eight symbol periods to obtain a time domain average signal ($d_{avg}^{N_L}(l, k)$).

Referring to FIG. 5 again, a differential correlation may be performed in accordance with a criterion (S120). The criterion may include a predetermined condition or conditions for the signal that, when met, indicates that the differential correlation be performed. For example, the differential correlation may be performed on the time domain average signal obtained at step S110 at a specific frequency axis interval.

Specifically, referring to FIG. 8, a signal ($C_{TDAvg,f;I\_sub(f)}^{(1,k)}$) obtained by performing the differential correlation while changing the frequency axis interval ($I_f$) may be obtained, using the following Formula 3.

$$C_{TDAvg,f,I_f}(l, k) = d_{avg}^{N_L}(l, k) \cdot conj\left(d_{avg}^{N_L}(l, k + I_f)\right) \quad <\text{Formula 3}>$$

For example, the differential correlation may be performed on the time domain average signal in units of the first frequency axis interval ($I_f=1$) to obtain $C_{TDAvg,f,1}$, the differential correlation may be performed on the time domain average signal in units of the second frequency axis interval ($I_f=2$) to obtain $C_{TDAvg,f,2}$, and the differential correlation may be performed on the time domain average signal in the unit of the third frequency axis interval ($I_f=3$) to obtain $C_{TDAvg,f,3}$.

FIG. 8 shows a process of performing the difference correlation calculation on the time domain average signal in units of the second frequency axis interval ($I_f=2$) to obtain $C_{TDAvg,f,2}$.

Referring to FIG. 5 again, the power of the synchronization signal provided from the cell is measured, using the differential correlation result (S130).

For example, by selecting one of a first power of the synchronization signal measured using the result ($C_{TDAvg,f,1}$) obtained by performing the differential correlation on the time domain average signal at the first frequency axis interval ($I_f=1$), and a second power of the synchronization signal measured using the result ($C_{TDAvg,f,2}$) obtained by performing the differential correlation on the time domain average signal at the second frequency axis interval ($I_f=2$), NRSRP may be measured.

Specifically, the NRSRP may be obtained for each of the signals ($C_{TDAvg,f;I\_sub(f)}^{(1,k)}$) on which the differential correlation is performed while changing the frequency axis interval ($I_f$) through the following Formula 4.

$$C_{TDAvg,f,I_f} = \frac{1}{(12 - N_L) \cdot (12 - I_f)} \cdot \sum_{l=0}^{11-N_L} \left| \sum_{k=0}^{11-I_f} C_{TDAvg,f,I_f}(l, k) \right| \quad <\text{Formula 4}>$$

That is, ($C_{TDAvg,f;I\_sub(f)}^{(1,k)}$) which is the NRSRP value may be calculated on which the differential correlation is performed while changing the frequency axis interval ($I_f$) through an absolute value calculation and a normalization calculation for the signal ($C_{TDAvg,f;I\_sub(f)}^{(1,k)}$).

In some embodiments, the NRSRP may measure the power having the smaller value among the first power obtained by measuring the result ($C_{TDAvg,f,1}$) acquired by performing the differential correlation on the time domain average signal at the first frequency axis interval ($I_f=1$) using the Formula 4, and the second power obtained by measuring the result ($C_{TDAvg,f,2}$) acquired by performing the differential correlation on the time domain average signal at the second frequency axis interval ($I_f=2$) using the Formula 4, as NRSRP.

The reason for measuring NRSRP in this way is that the influences of noise in the NRSRP measurement process can be minimized and the cross-correlation characteristics can be improved when measuring the NRSRP through the multiple simulations in this way.

Hereinafter, this will be described in more detail with reference to FIGS. 9 through 12.

FIGS. 9 to 12 are diagrams for explaining the effects of the operating method for the IoT device according to some embodiments.

FIGS. 9 to 12 are graphs in which maximum values among the values obtained by performing the cross-correlation calculation between the own cell ID and all other cell IDs (five hundred and three) in the cell ID on the X-axis are shown in a decibel (dB) scale on the Y-axis, and which shows a value obtained by normalizing the maximum values by the correlation value using own cell ID. That is, in the case of own cell ID, the correlation value is 0 dB. In the graph, a value having a small Y value means good cross-correlation characteristics.

Left graphs of FIGS. 9 to 12 are graphs showing $C_{freq,1}$, $C_{freq,2}$, $C_{freq,3}$ of the following Formula 5 in accordance with $^{N_L}$(AvgSym) which is the number of symbols applied to the time domain average calculation, and right graphs are graphs showing $C_{min1}$, $C_{min2}$ of the following Formula 5 in accordance with $^{N_L}(AvgSym)$ which is the number of symbols applied to the time domain average calculation.

$$C_{freq1} = C_{TDAvg,f,1} \text{ with } I_f=1$$

$$C_{freq2} = C_{TDAvg,f,2} \text{ with } I_f=2$$

$$C_{freq3} = C_{TDAvg,f,3} \text{ with } I_f=3$$

$$C_{min1} = \min(C_{TDAvg,f,1}, C_{TDAvg,f,2})$$

$$C_{min2} = \min(C_{TDAvg,f,1}, C_{TDAvg,f,2}, C_{TDAvg,f,3}) \quad \text{<Formula 5>}$$

Referring to FIGS. 9 to 12, it is possible to understand that, as the number of symbols $^{N_L}(AvgSym)$ applied to the time domain average calculation increases, the cross-correlation characteristic are improved, and in $C_{min1}$, $C_{min2}$ of $N_L=8$, the cross-correlation characteristics up to −9.7 dB or more may be observed in all the cell ID combinations. When measuring NRSRP using $C_{min1}$ in $N_L=8$ on the basis of the simulation results, the cross-correlation characteristics may be maximized.

That is, when selecting the power having the smaller value among the first power obtained by measuring the result ($C_{TDAvg,f,1}$) acquired by performing the differential correlation on the time domain average calculation signal obtained by performing the time domain average calculation on the eight symbols at the first frequency axis interval ($I_f=1$) using the Formula 4, and the second power obtained by measuring the result ($C_{TDAvg,f,2}$) acquired by performing the differential correlation on the time domain average signal at the second frequency axis interval (If=2) using the Formula 4, it is possible to measure NRSRP having the maximized cross-correlation characteristics.

Hereinafter, a signal processor according to some embodiments will be described with reference to FIG. 13. Hereinafter, repeated description of the contents described above will not be provided, and differences will be mainly described.

Figure 13:
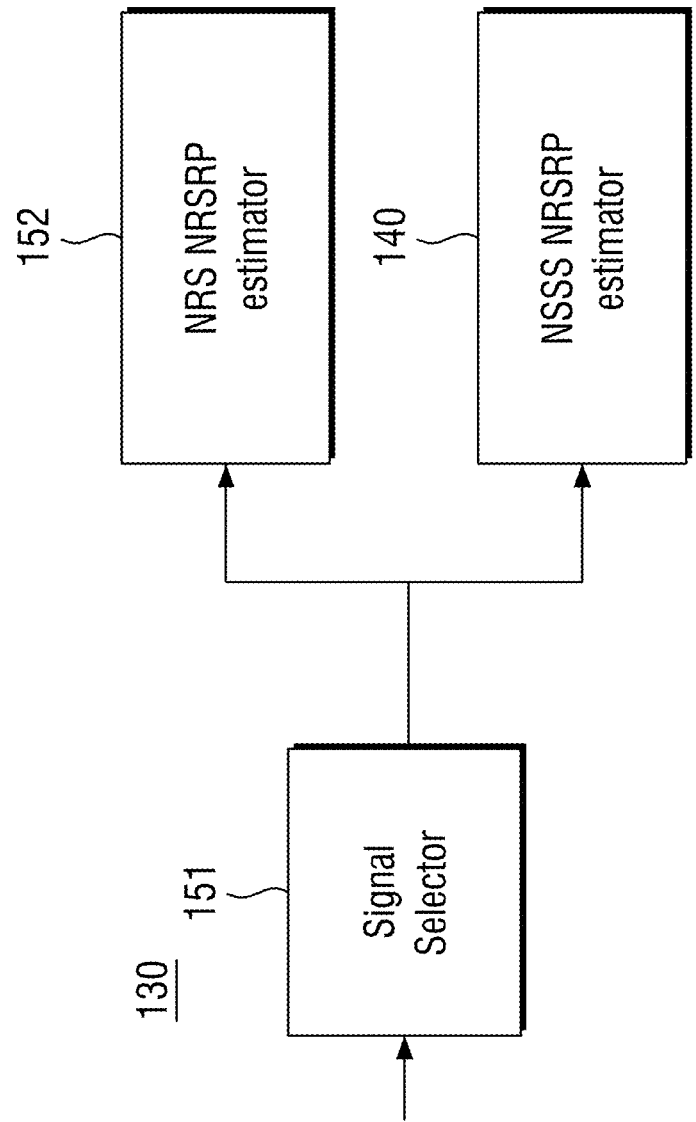
FIG. 13 is a block diagram for explaining a signal processor according to some embodiments.

FIG. 13 is a block diagram for explaining a signal processor according to some embodiments.

Referring to FIG. 13, the signal processor 150 may further include a measurement signal selector 151 and an NRS NRSRP estimator 152.

The constituent elements included in the illustrated signal processor 150 may also be implemented as a dedicated hardware block designed through logic synthesis or the like, implemented as a processor including at least one processor and a software block executed by at least one processor, and may be implemented as a combination of a dedicated hardware block and a processor. The signal processor 150 may be a part of the processor architecture described above, or may be part of an independent processing architecture with at least one processor and a dedicated hardware block.

The measurement signal selector 151 may determine a signal used for power measurement among the received synchronization signals. If the determined signal is NSSS, the measurement signal selector 151 may provide the signal to the descrambler 141 so that NRSRP measurement is performed through the descrambler 141, the time domain average calculator 142, the differential correlation calculator 143, and the power estimator 144 described above.

If the determined signal is NRS, the measurement signal selector 151 may provide the signal to the NRS NRSRP estimator 152 so that the NRSRP measurement is performed through the NRS NRSRP estimator 152. More the specific operation of the measurement signal selector 151 will be described later.

Hereinafter, the operating method for the IoT device according to some embodiments will be described with reference to FIG. 14. Since the description of some of the constituent elements is not significantly different from the above-described embodiment, repeated description will not be provided.

Figure 14:
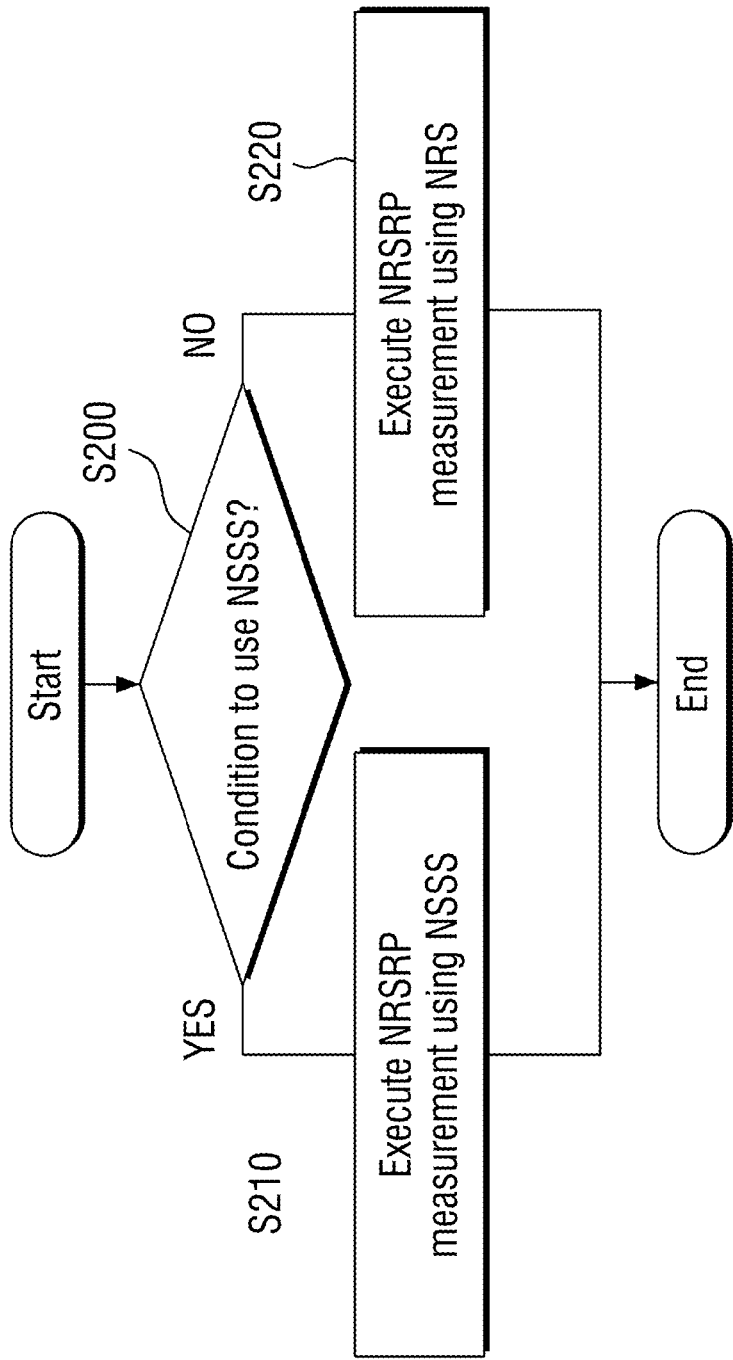
FIG. 14 is a flowchart for explaining the operating method for the IoT device according to some embodiments.

FIG. 14 is a flowchart for explaining the operating method for the IoT device according to some embodiments.

Referring to FIG. 14, it is determined whether NRSRP measurement is enabled using NSSS (S200).

If the NRSRP measurement is enabled using NSSS, NRSRP is measured using NSSS in accordance with the example method associated with the processor as described above (S210). If the NRSRP measurement is disabled using NSSS, NRSRP is measured using NRS (S220).

In some embodiments, determination as to whether NRSRP measurement is enabled using NSRS may include determining that the NRSRP measurement is enabled using NSSS if any one of the following conditions 1 to 5 is satisfied:

(1) whether a neighbor cell is included in an intra-frequency cell list;
(2) whether to measure the NRSRP for an inter-frequency measurement;
(3) whether the number of available NRS subframes is equal to or less than a reference number;
(4) whether the NSSS signal is included in the signal received during a minimum wake-up period of the electronic device; and
(5) whether SINR (Signal to Interference plus Noise Ratio) is equal to or less than a reference SINR.

Figure 15:
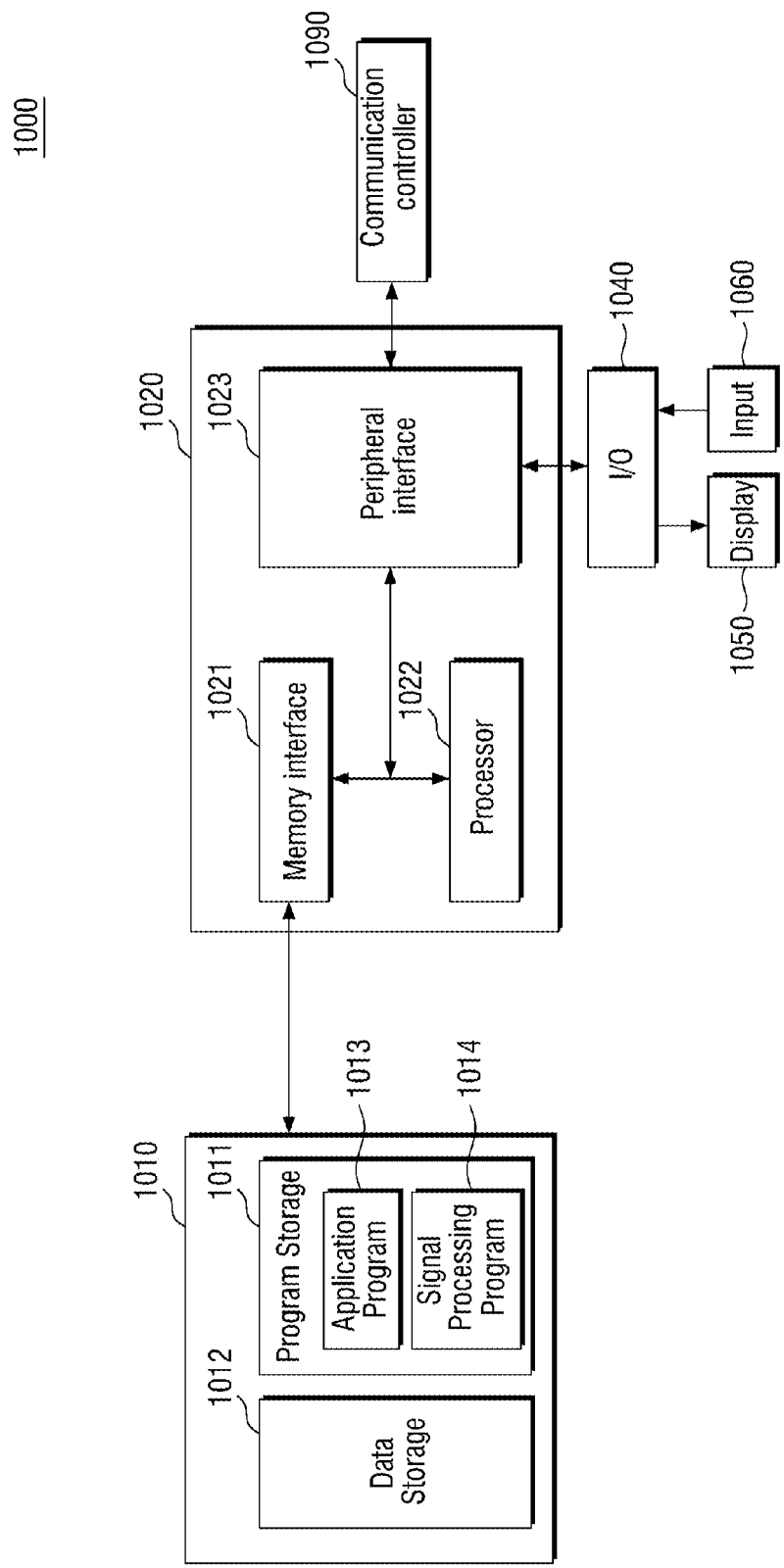
FIG. 15 is a block diagram for explaining an electronic device according to some embodiments.

FIG. 15 is a block diagram for explaining an electronic device according to some embodiments.

Referring to FIG. 15, an electronic device 1000 may include a memory 1010, a processor unit 1020, an input/output controller 1040, a display 1050, an input 1060, and a communication controller 1090. Here, a plurality of memories 1010 may be disposed.

The memory 1010 may include a program storage 1011 that stores a program for controlling the operation of the electronic device, and a data storage 1012 that stores data generated during program execution. The data storage 1012 may store data necessary for the operation of the application program 1013 and the signal processing program 1014.

The program storage 1011 may include an application program 1013 and a signal processing program 1014. Here, the programs included in the program storage 1011 may be expressed as an instruction set as a set of commands.

The application program 1013 may include an application program that operates on the electronic device. That is, the application program 1013 may include a command of an application driven by the processor 1022, which may operate the electronic device. The signal processing program 1014 may include codes for implementing the operating method described above.

The peripheral device interface 1023 may control the connection between a device and the base station or connections among the input/output peripheral devices of the base station, the processor 1022, and the memory interface 1021. The processor 1022 controls the base station to provide the service, using at least one software program. At this time, the processor 1022 may execute at least one program stored in the memory 1010 to provide a service corresponding to the program.

The input/output controller 1040 may provide an interface between an input/output device such as the display 1050 and the input 1060, and the peripheral device interface 1023. The display 1050 displays the status information, characters to be input, moving pictures, still pictures and the like. For example, the display 1050 may display application program information driven by the processor 1022.

The input 1060 may provide data, for example input data generated by the selection of the electronic device, to the processor unit 1020 through the input/output controller 1040. At this time, the input 1060 may include a keypad including at least one hardware button, a touchpad that detects touch information and the like. For example, the input 1060 may provide touch information such as a touch, a touch motion, and a touch release detected through the touch pad to the processor 1022 through the input/output controller 1040. The electronic device 1000 may include a communication controller 1090 that executes communication functions for voice communication and data communication.

Although the embodiments of the present invention have been described with reference to the accompanying drawings, the present invention may be fabricated in various different forms without being limited to the above-described embodiments. Further, those skilled in the art will appreciate that the present invention may be implemented in other specific forms without changing the technical idea or essential features of the present invention. Accordingly, the embodiments described above should be understood in an illustrative manner rather than a limited manner in all aspects.

What is claimed is:

1. An operating method for an electronic device, comprising:
    descrambling a synchronization signal received from a cell;
    acquiring a time domain average signal based on the descrambled synchronization signal;
    executing a differential correlation on the time domain average signal based on a criterion; and
    measuring a power of the synchronization signal from the cell, using a result of the executed differential correlation,
    wherein the acquiring the time domain average signal includes calculating an average on the descrambled synchronization signal for a plurality of symbol periods, and
    each of the plurality symbol periods includes a plurality of frames.

2. The operating method for the electronic device of claim 1, wherein the synchronization signal comprises a NSSS (Narrow Secondary Synchronization Signal) used for a NB-IoT (Narrow Band-Internet of Things) communication, and
    the measuring of the power of the synchronization signal comprises measuring NRSRP (Narrow Reference Signal Received Power) of the synchronization signal received from the cell using the NSSS.

3. The operating method for the electronic device of claim 1, wherein the acquiring the time domain average signal comprises:
    determining N, where N is a natural number; and
    calculating an average on the descrambled synchronization signal for N symbol periods to acquire the time domain average signal.

4. The operating method for the electronic device of claim 3, wherein N is 8.

5. The operating method for the electronic device of claim 1, wherein the executing the differential correlation comprises:
    determining a frequency axis interval, and
    executing the differential correlation on the time domain average signal based on the frequency axis interval.

6. The operating method for the electronic device of claim 5, wherein the frequency axis interval comprises a first frequency axis interval and a second frequency axis interval, the first frequency axis interval being different from the second frequency axis interval.

7. The operating method for the electronic device of claim 6, wherein the measuring the power of the synchronization signal from the cell using the result of the executed differential correlation comprises:
    selecting a first power of the synchronization signal measured using a first result obtained by executing the differential correlation on the time domain average signal at the first frequency axis interval, and a second power of the synchronization signal measured using a second result obtained by executing the differential correlation on a time domain average signal at the second frequency axis interval.

8. The operating method for the electronic device of claim 7, wherein a smaller value among the first power and the second power is measured as the power of the synchronization signal.

9. The operating method for the electronic device of claim 6, wherein the executing the differential correlation on the time domain average signal at the frequency axis interval comprises:
    executing the differential correlation on the time domain average signal at one sample interval on a frequency axis,
    executing the differential correlation on the time domain average signal at two sample intervals on the frequency axis, and
    executing the differential correlation on the time domain average signal at three sample intervals on the frequency axis.

10. The operating method for the electronic device of claim 1, further comprising:
    determining a signal used for measuring the power of the synchronization signal from the cell,
    wherein the measuring the power of the synchronization signal comprises measuring the power of the synchronization signal, using the determined signal.

11. The operating method for the electronic device of claim 10, wherein the determining of the signal used for measuring the power of the synchronization signal from the cell comprises:
    determining which signal among NSSS or NRS (Narrow Reference Signal) used for NB-IoT communication is selected, and
    the measuring the power of the synchronization signal comprises measuring NRSRP, using the determined signal among the NSSS and the NRS.

12. The operating method for the electronic device of claim 11, wherein determining which signal among the NSSS or NRS is selected comprises:
    determining whether any one of the following conditions (1) to (5) is satisfied:
    (1) whether a neighbor cell is included in an intra-frequency cell list,
    (2) whether to measure the NRSRP for an inter-frequency measurement, (3) whether a number of available NRS subframes is equal to or less than a reference number, (4) whether an NSSS signal is included in a signal received during a minimum wake-up period of the electronic device, and (5) whether SINR (Signal to Interference plus Noise Ratio) is equal to or less than a reference SINR.

13. The operating method for the electronic device of claim 12, wherein if any one of the conditions (1) to (5) is satisfied, the NRSRP is measured using the NSSS.

14. A signal processor comprising:
a descrambler configured to receive a synchronization signal from a cell and descramble the synchronization signal;
a time domain average calculator configured to receive the descrambled synchronization signal and execute a time domain average calculation to output a time domain average signal;
a differential correlation calculator configured to receive the time domain average signal and execute a differential correlation to output a result of the executed differential correlation; and
a power estimator configured to measure a power of a synchronization signal from the cell using the result of the differential correlation calculator,
wherein the execute the time domain average calculation includes calculating an average on the descrambled synchronization signal for a plurality of symbol periods, and
each of the plurality symbol periods includes a plurality of frames.

15. The signal processor of claim 14, wherein the synchronization signal comprises Narrow Secondary Synchronization Signal (NSSS) used for a NB-IoT communication, and
the power estimator measures Narrow Reference Signal Received Power (NRSRP) of the synchronization signal received from the cell, using the NSSS.

16. The signal processor of claim 14, wherein the differential correlation calculator is configured to execute the differential correlation on the time domain average signal at a first frequency axis interval to output a first result, and executes the differential correlation on the time domain average signal at a second frequency axis interval different from the first frequency axis interval to output a second result.

17. The signal processor of claim 16, wherein the power estimator is configured to measure the power of the synchronization signal from the cell, using any one of the first result and the second result.

18. The signal processor of claim 17, wherein the power estimator is configured to determine a power having a smaller value among a first power measured using the first result and a second power measured using the second result, as a power of the synchronization signal.

19. The signal processor of claim 18, wherein the time domain average calculator is configured to calculate an average of the descrambled synchronization signal for symbol intervals of N to output the time domain average signal, where N is a natural number.

20. An operating method for an electronic device, comprising:
descrambling Narrow Secondary Synchronization Signal (NSSS) in a synchronization signal including NSSS received from a cell;
calculating an average between eight symbol periods of the descrambled NSSS and acquiring a time domain average signal on the basis of the average;
executing a differential correlation on the time domain average signal at least a first and a second frequency axis interval to acquire a first and a second results, the first and the second frequency axis interval being different from each other; and
measuring each Narrow Reference Signal Received Power (NRSRP) on the first and second results, and determining a measurement value, the measurement value having the smaller value among the first and second results as an NRSRP of the synchronization signal from the cell,
wherein each of the eight symbol periods includes a plurality of frames.

* * * * *